United States Patent
Lin

(10) Patent No.: US 7,924,317 B2
(45) Date of Patent: Apr. 12, 2011

(54) METHOD AND APPARATUS FOR REDUCING MOTION BLUR IN DIGITAL IMAGES

(75) Inventor: Sheng Lin, Sunnyvale, CA (US)

(73) Assignee: Aptina Imaging Corporation, George Town (KY)

( * ) Notice: Subject to any disclaimer, the term of this patent is extended or adjusted under 35 U.S.C. 154(b) by 510 days.

(21) Appl. No.: 12/046,860

(22) Filed: Mar. 12, 2008

(65) Prior Publication Data

US 2009/0231446 A1 Sep. 17, 2009

(51) Int. Cl.
*H04N 5/228* (2006.01)

(52) U.S. Cl. ............. 348/208.4; 348/208.6; 348/208.99; 382/232; 382/250; 382/251; 375/240.08; 375/240.2

(58) Field of Classification Search ................. 348/208.4
See application file for complete search history.

(56) References Cited

U.S. PATENT DOCUMENTS

| 6,140,630 | A | 10/2000 | Rhodes |
| 6,204,524 | B1 | 3/2001 | Rhodes |
| 6,285,794 | B1 | 9/2001 | Georgiev et al. |
| 6,310,366 | B1 | 10/2001 | Rhodes et al. |
| 6,326,652 | B1 | 12/2001 | Rhodes |
| 6,333,205 | B1 | 12/2001 | Rhodes |
| 6,376,868 | B1 | 4/2002 | Rhodes |
| 7,167,199 | B2 | 1/2007 | Soupliotis et al. |
| 7,248,751 | B2 | 7/2007 | Schuler et al. |
| 7,289,142 | B2 | 10/2007 | Silverbrook |
| 2004/0145673 | A1* | 7/2004 | Washisu .................. 348/364 |
| 2004/0258154 | A1* | 12/2004 | Liu et al. ............... 375/240.16 |
| 2005/0018908 | A1* | 1/2005 | Johannesson et al. ........ 382/232 |
| 2006/0140507 | A1 | 6/2006 | Ohki |
| 2006/0153472 | A1* | 7/2006 | Sakata et al. ............... 382/255 |
| 2006/0257042 | A1 | 11/2006 | Ofek et al. |
| 2007/0019094 | A1 | 1/2007 | Silberstein |
| 2007/0058073 | A1 | 3/2007 | Steinberg et al. |
| 2007/0183765 | A1 | 8/2007 | Imamura |
| 2007/0222864 | A1 | 9/2007 | Hiraga et al. |
| 2007/0258707 | A1 | 11/2007 | Raskar |
| 2008/0247465 | A1* | 10/2008 | Xin et al. ............... 375/240.16 |
| 2008/0260265 | A1* | 10/2008 | Silverstein et al. .......... 382/232 |

FOREIGN PATENT DOCUMENTS

| JP | 10111928 | 4/1998 |
| JP | 2006 033850 | 2/2006 |
| JP | 2006 165614 | 6/2006 |
| JP | 2007 116728 | 5/2007 |
| TW | 379509 B | 1/2000 |

* cited by examiner

*Primary Examiner* — Sinh Tran
*Assistant Examiner* — Paul Berardesca

(57) ABSTRACT

A method and apparatus for reducing motion blur in digital images. An imager captures a reference frame and a plurality of target frames. Feature blocks preferably containing strong two-dimensional features are identified in the reference frame. Corresponding features are identified in the target frames and motion vectors representing the movement of features are calculated. Based at least in part on the motion vectors, corresponding pixels in the reference and target frames are identified and combined to form an output image. Efficient methods for identifying corresponding features in apparatuses with small buffer memories by serially processing frame strips are also disclosed.

18 Claims, 10 Drawing Sheets

METHOD AND APPARATUS FOR REDUCING MOTION BLUR IN DIGITAL IMAGES

FIELD OF THE INVENTION

The disclosed embodiments relate generally to imagers and, more particularly, to methods and apparatuses for reducing motion blur in digital images.

BACKGROUND

Imagers typically consist of an array of pixel cells containing photosensors. Each pixel cell produces a signal corresponding to the intensity of light impinging on its photosensor when an image is focused on the array by one or more lenses. These signals may be stored in a memory and displayed on a monitor, manipulated by software, printed to paper, or otherwise used to provide information about the image. The magnitude of the signal produced by each pixel is substantially proportional to the amount of light impinging on a respective photosensor.

Several kinds of imagers are generally known. Complementary metal-oxide-semiconductor ("CMOS") imagers and charge coupled device ("CCD") imagers are among the most common. CMOS imagers are discussed, for example, in U.S. Pat. Nos. 6,140,630, 6,376,868, 6,310,366, 6,326,652, 6,204,524, and 6,333,205, all assigned to Micron Technology, Inc.

CMOS or other imagers typically comprise thousands or even millions of picture elements ("pixel") cells arranged in rows and columns. Each pixel cell typically comprises a photodiode or other photosensitive element configured to convert incident light into an electrical charge. The electrical charges are accumulated in a capacitor or other storage node during an integration period, then readout, converted to a digital value, and combined with other digital pixel values to form an image. The amount of electrical charge accumulated, and therefore the corresponding digital pixel value, depends on the number of photons impacting the photosensitive element during integration. More photons (i.e., brighter light) yield a greater electrical charge and a correspondingly larger digital pixel value. In low light situations, however, there is little difference between the amount of electrical charge accumulatd in a "bright" pixel cell as compared to a "dim" pixel cell. This often yields noisy, poor quality images.

One method for increasing image quality in low-light situations is to increase the integration period, thereby allowing more time for electrical charge to accumulate in "bright" pixels. However, a longer integration period can result in a blurred images due to movement of the imager or the subject during the integration period. Therefore, a method of capturing high-quality images in low-light conditions without increasing integration time is desirable.

DETAILED DESCRIPTION OF THE DISCLOSED EMBODIMENTS

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely an example. The sequence of steps is not limited to that set forth herein and may be changed or reordered, with the exception of steps necessarily occurring in a certain order.

Figure 1:
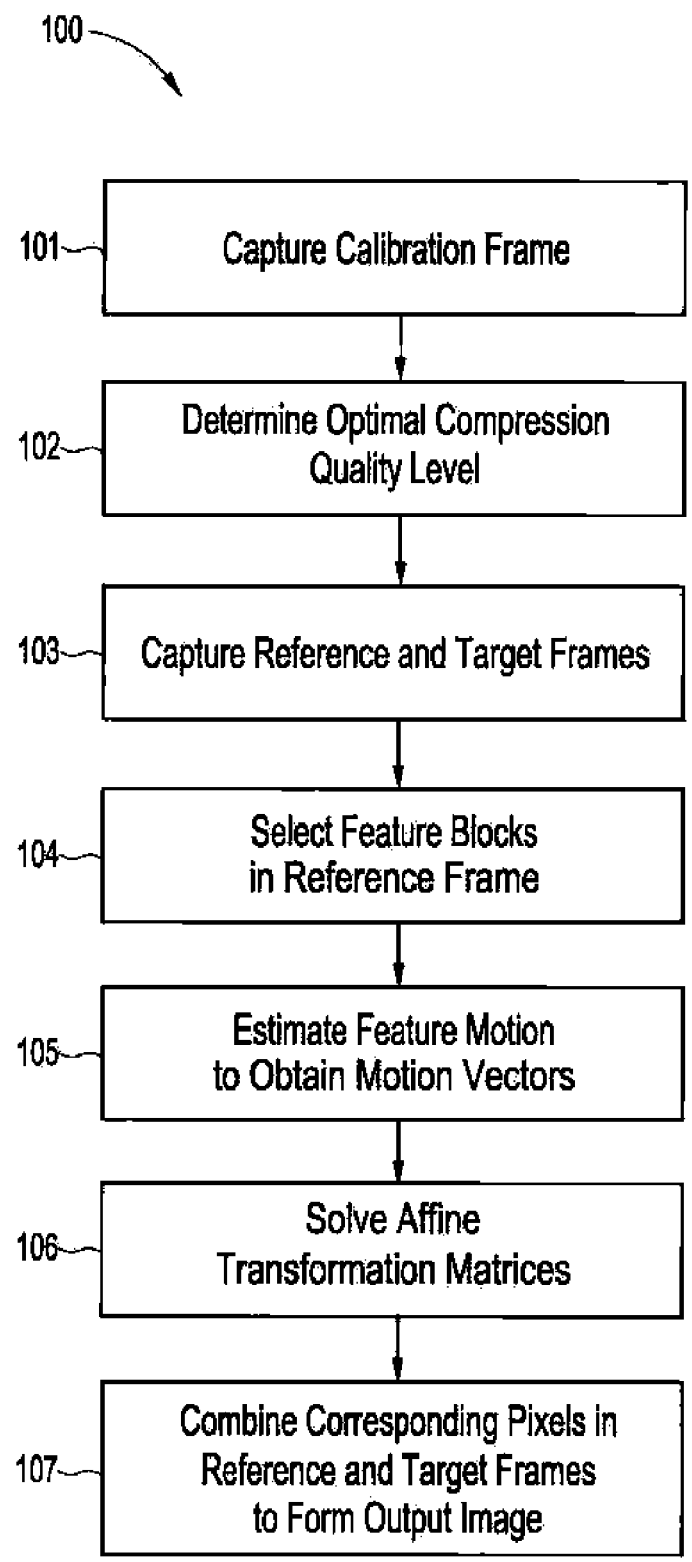
FIG. 1 is a flow chart illustrating a method of reducing motion blur in digital images in accordance with a disclosed embodiment.

FIG. 1 illustrates a method 100 of reducing motion blur in digital images in accordance with a disclosed embodiment. Although the steps 101-107 are shown as a linear sequence for simplicity, some steps can be performed simultaneously (e.g., on different portions of an image) and some steps are performed repeatedly, as described below. Generally, the method 100 comprises capturing a calibration frame at step 101. At step 102, calibration forme pixel data is used to determine a compression quality level that provides good image quality while allowing the reference and target frames to be stored in available memory. At step 103, the reference frame and target frames are captured, compressed at the quality level determined in step 102, and stored in a memory. At step 104, feature blocks within the reference frame are selected. At step 105, motion searches are performed to locate each feature block within each target frame. The motion search yields motion vectors corresponding to the movement of the feature block between the reference frame and each target frame. At step 106, the motion vectors are used to solve affine transformation matrices modeling image distortion (e.g., translation, rotation, and scaling) due to imager or subject movement. At step 107, corresponding pixels in the reference frame and each target frame are combined. In this way, a higher quality output image (i.e., one with less noise and motion blur) can be generated in a low-light situation. The steps of method 100 are now described in greater detail with reference to FIGS. 2-8 and formulas (1) to (19).

Figure 2:
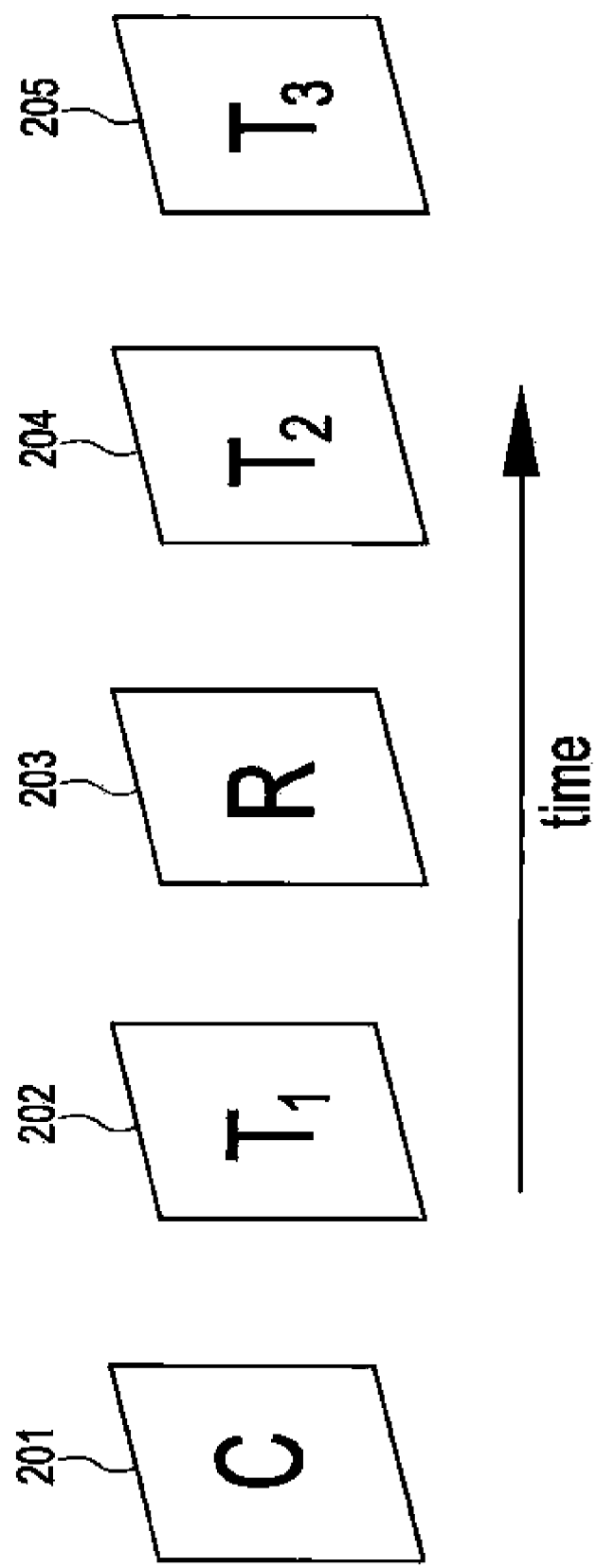
FIG. 2 illustrates a sequence of frames captured in accordance with a disclosed embodiment.

FIG. 2 illustrates an example embodiment of frames captured at steps 101 and 103. A calibration frame (C) 201 is captured at step 101. Three target frames ($T_1$, $T_2$, $T_3$) 202, 204, 205 and a reference frame (R) 203 are captured at step 103. In the illustrated embodiment, the reference frame 203 is captured after the first target frame 202 and before the second target frame 204 and the third target frame 205. However, other embodiments are possible. For example, the imager might capture as few as two target frames or as many as a five or more target frames. Moreover, the reference frame 203 need not be immediately after the first target frame 202, but instead can be captured at any point in the sequence. For example, the reference frame 203 can be captured substantially in the middle of the sequence of target frames to minimize the temporal distance between the reference frame 202 and the target frames. Reducing the time elapsed between capturing the reference frame 202 and capturing each of the target frames reduces the movement of objects as between the reference frame 202 and each of the target frames, thereby improving the effectiveness of the disclosed embodiments and the quality of the output image. In alternative embodiments, the reference frame is selected dynamically (i.e., after the sequence of frames has been captured). Referring to FIG. 2, for example, frame 203 might not be selected as the reference frame until after frames 202, 203, 204, and 205 have been captured, compressed, and stored in memory. By delaying reference frame selection until after the sequence of frames has been captured, the sharpest frame can be selected as the reference frame. In one embodiment, the frame that requires the largest number of bytes to store after JPEG compression is selected as the reference frame.

Some imager memories may not be large enough to simultaneously store the reference frame 203 and plurality of target frames 202, 204, 205. One solution is to increase imager memory capacity with additional hardware. However, this approach can be expensive and may not be practical with some hardware (e.g., low-cost imagers). Alternatively, an image compression algorithm (e.g., the JPEG compression algorithm) can be used to compress the frames before they are stored in memory. The JPEG compression algorithm provides a range of compression ratios. Higher compression ratios yield smaller files, allowing more images to be stored in a given memory, but also reduce image quality. Conversely, lower compression ratios yield larger files but higher quality images. Therefore, it is desirable to select the lowest compression ratio required to satisfy memory constraints (i.e., to permit the reference frame and target frames to be stored in memory).

Figure 3:
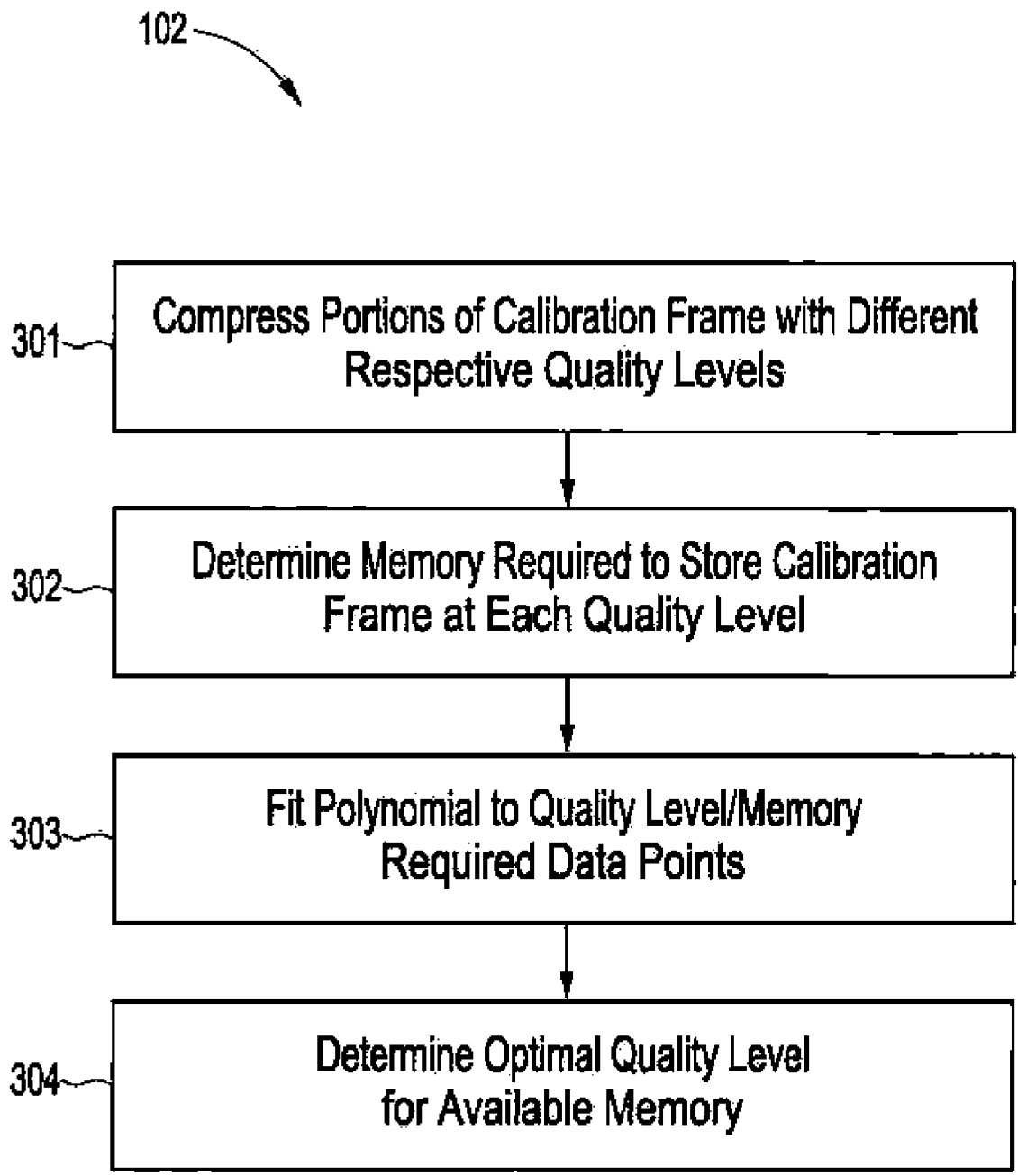
FIG. 3 is a flow chart illustrating a method of determining an optimal compression ratio in accordance with a disclosed embodiment.

FIG. 3 illustrates a method for determining an optimal compression quality level (i.e., step 102) according to a disclosed embodiment. At step 301, portions of the calibration frame 201 are compressed (e.g., with the JPEG algorithm) at different restive quality levels. As described below, the JPEG algorithm compresses images in minimum coded units (MCUs). Each MCU is typically a 16×8 pixel block. In one embodiment, a first strip (i.e., a first MCU row) is JPEG compressed at a first quality level. The next strip is compressed at a second quality level, and so on. Once a desired number of different quality levels (e.g., four different quality levels) have been use the quality levels can be repeated in subsequent strips until all MCU rows have been compressed. With four different quality levels, the fifth strip could be compressed, for example, at the same quality level as the first strip. The sixth strip could be compressed at the same quality level as the second strip, and so on.

Different JPEG compression quality levels can be achieved by scaling the default quantization tables provided in the JPEG specification. A larger scaling factor reduces the quality level, thereby reducing the amount of memory required to store the compressed image, but also reducing image quality. For example, a strip compressed with the default quantization tables (i.e., tables scaled by a factor of 1) will require more storage, but will be of higher image quality an a strip compressed with the quantization tables scaled by a factor of 2. In one embodiment, the scaling factors are 0.125, 0.25, 0.5 and 1.

At step 302, the number of bytes required to store the entire calibration frame is estimated. Continuing the above example with four different compression quality levels, the number of bytes required to store the calibration frame at the first compression quality level could be estimated by summing the number of bytes required to store each MCU row compressed at the first quality level and multiplying the sum by four because, with four different compression quality levels, one-quarter of the MCU rows in the calibration frame would have been compressed at the first quality level. The number of bytes required to store the calibration frame at the other compression quality levels can be estimated similarly. Of course, other multiplicands may be used depending on the number of compression quality levels.

The relationship between the scaling factor applied to the quantization tables and the number of bytes required to store the calibration frame is not linear but can be approximated by a polynomial equation. At step 303, a polynomial is fitted to the data points (i.e., the number of bytes required to store the calibration frame at each quality level). When, as in the above example, strips of the calibration frame are compressed with four different scaled quantization tables, a third-order polynomial can be fined to the resulting four data points. The polynomial can be used to determine the optimal acing factor (i.e., the optimal compression quality level) based on the bytes of memory available to store the reference and target frames.

The scaling factor, q, applied to the quantization tables can be expressed as a function of the number of bytes, s, required to store the calibration frame as follows:

$$q = p_3 s^3 + p_2 s^2 + p_1 s + p_0 \qquad (1)$$

where $p_0$, $p_1$, $p_2$, and $p_3$ are polynomial parameters. Let the scaling factors used to compress the four calibration frame strips in the above example be denoted as $q_1$, $q_2$, $q_3$, and $q_4$ and the corresponding calibration frame storage requirements be denoted as $s_1$, $s_2$, $s_3$, and $s_4$, respectively. In other words, $s_1$ represents the number of bytes required to store the calibration frame compressed using the default JPEG quantization tables provided in the JPEG specification scaled by a factor $q_1$. Inserting these values into Equation (1), and rewriting it in matrix form, yields the following:

$$\begin{bmatrix} s_1^3 & s_1^2 & s_1 & 1 \\ s_2^3 & s_2^2 & s_2 & 1 \\ s_3^3 & s_3^2 & s_3 & 1 \\ s_4^3 & s_4^2 & s_4 & 1 \end{bmatrix} \times \begin{bmatrix} p_3 \\ p_2 \\ p_1 \\ p_0 \end{bmatrix} = \begin{bmatrix} q_1 \\ q_2 \\ q_3 \\ q_4 \end{bmatrix} \qquad (2)$$

Gaussian Elimination is one method that can be used to determine values of the polynomial parameters $p_0$, $p_1$, $p_2$, and $p_3$ in Equation (2). Once the polynomial parameters are determined, Equation (1) can be used, at step 304, to determine the optimal scaling factor, q, to apply to the quantization tables by substituting the number of bytes of available memory for s. For example, suppose 1,048,576 ($2^{20}$) bytes of memory are available to store each of the reference and target frames. Equation 1 could then be rewritten as follows:

$$q = p_3 (2^{20})^3 + p_2 (2^{20})^2 + p_1 (2^{20}) + p_0 \qquad (1a)$$

Using the constants $p_0$, $p_1$, $p_2$, and $p_3$, the optimal scaling factor q can be computed.

Returning to the high-level flowchart of FIG. 1, at step 103, the imager captures the reference frame 203 and the plurality of target frames 202, 204, 205. The reference frame 203 and the plurality of target frames 202, 204, 205 can be JPEG compressed using quantization tables scaled using the optimal scaling factor, q, determined as described above. This allows the reference and target fines to be stored in available memory without unnecessarily sacrificing image quality.

At steps 104 and 105, corresponding features in the reference frame 203 and each of the target frames 202, 204, 205 are identified. Using these corresponding features affine transformation matrices are solved at step 106, and the reference frame and target frames are combined to form an output image at step 107. To reduce computational complexity, only portions of the reference frame and target frames are searched for corresponding features at step 105. These portions, referred to herein as "feature blocks," preferably include strong two-dimensional features (e.g., the corner of an object forming a substantially right angle or a pair of crisscrossing lines).

In a disclosed embodiment, feature block selection is performed on reference frame pixel data only. As described above, the reference frame 203 can be captured, JPEG compressed, and stored in a memory at step 103. The JPEG compression algorithm encodes data in minimum coded units (MCUs). Each MCU typically comprises a 16×8 pixel block with luminance (Y), first chrominance (Cb), and second chrominance (Cr) channel values. Conventionally, each pixel has an associated luminance channel (Y) value, but chrominance values are subsampled horizontally. For example, each 2×1 pixel block typically contains two luminance channel (Y) values, one first chrominance channel (Cb) value, and one second chrominance channel (Cr) value. This sampling scheme is often referred to as YCbCr 4:2:2 format. In a disclosed embodiment described below, only luminance channel (Y) pixel data is used to select feature blocks, and each feature block corresponds to one 16×8 pixel MCU.

Figure 5:
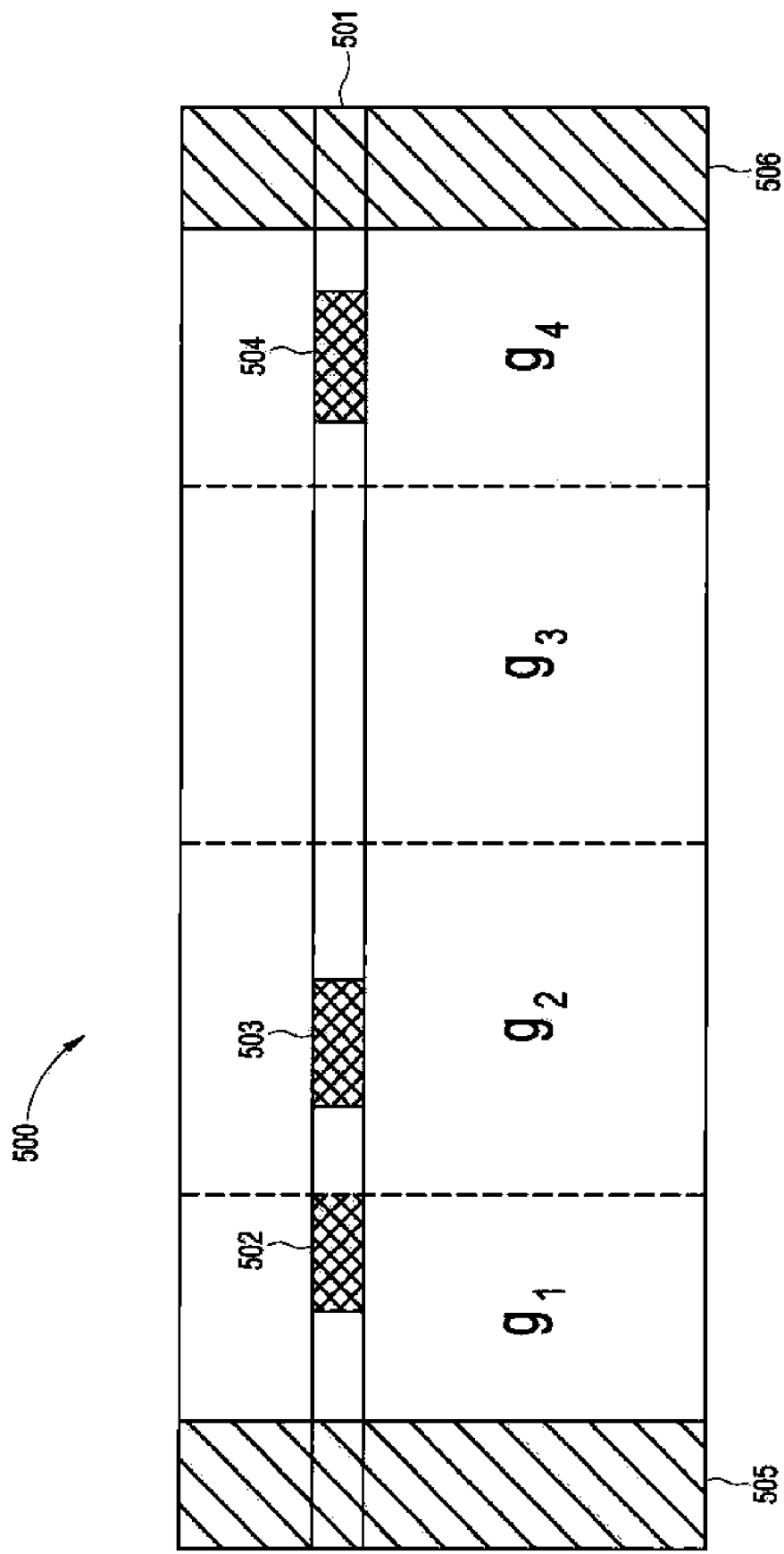
FIG. 5 illustrates features blocks in a portion of a reference frame in accordance with a disclosed embodiment.

A method for selecting which MCUs will be feature blocks will now be described. According to a disclosed embodiment, the reference frame can be processed as a plurality of strips, each strip comprising a row of MCUs. For example, if the reference frame comprises 640×480 pixels, one strip would be 640 pixels (forty 16×8 pixel MCUs) wide and 8 pixels (one 16×8 pixel MCU) tall. Each strip can be further divided into a plurality of regions. FIG. 5 illustrates a reference frame 500 divided into a plurality of regions $g_1$, $g_2$, $g_3$, and $g_4$. FIG. 5 also illustrates a strip being processed 501 and features blocks 502, 503, 504 therein. Assuming typical 16×8 pixel MCUs, the strip 501 is 8 pixels tall and each feature block 502, 503, 504 is a 16×8 pixel block.

To limit computation complexity the number of feature blocks in a strip can be limited to at most one per region. Thus, the number of feature blocks, and therefore the computational complexity, is directly related to the number of regions. If processing power is abundant, a large number of regions can be defined to increase noise reduction effectiveness and consequently increase image output quality. Conversely, if processing power is limited, a smaller number of regions can be defined. In the embodiment illustrated in FIG. 5, there are four regions $g_1$, $g_2$, $g_3$, and $g_4$, each comprising about one-quarter of the column in the reference frame 500. Regions need not be defined as rectangles or even along column. However, region boundaries are preferably aligned with MCUs.

Figure 4:
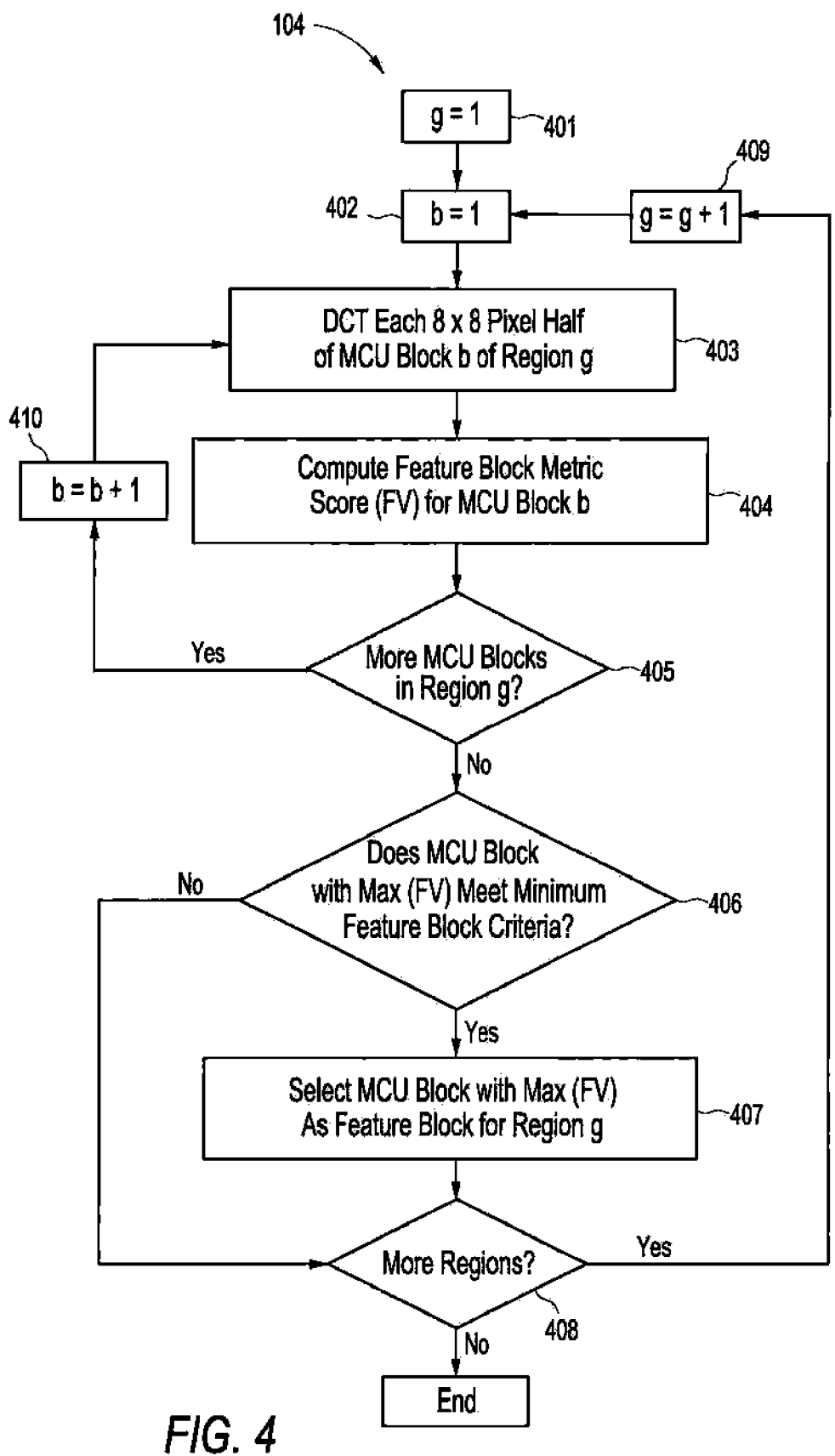
FIG. 4 is a flow chart illustrating a method of selecting feature blocks in accordance with a disclosed embodiment.

A method for selecting feature blocks (i.e., step 104) in each strip of the reference frame is illustrated by the flow chart of FIG. 4. At step 401, a variable g representing the current region is initialized to 1 (i.e., the first region). Similarly, at step 402, a variable b representing the current MCU in the current strip is initialized to 1 (i.e., the first MCU in the region). At step 403, a discrete cosine transform (DCT) is performed on each 8×8 pixel block of luminance (Y) data in the current region. As indicated above, each MCU typically comprises two 8×8 pixel blocks of luminance (Y) pixel data. Therefore, two DCT are performed on each MCU, one on the first 8×8 pixel half and another on the second 8×8 pixel half.

Let DCT(i, j) denote a DCT coefficient wherein i and j are integers ranging from 0 to 7, inclusive, with DCT(0, 0) being proportional to the mean value of the sub-block and each higher integer corresponding to a one-half cycle frequency increase. Thus, DCT(i, j) with increasing i and j parameters corresponds to increasingly high frequency components in the horizontal and vertical directions, respectively. For example, an 8×8 pixel block comprising a plurality of vertical lines would have a high DCT(7, 0) value and a low DCT(0, 7) value. Conversely, an 8×8 pixel block of substantially uniform pixel values would have a low DCT(i, j) value for non-zero i and j values.

The DCT coefficients can be used to identify 8×8 pixel blocks having strong two-dimensional features. Feature blocks with strong two-dimensional features are preferred as featured blocks because they permit more accurate determination of correspondences between the reference frame and the target frames in both the horizontal and vertical directions. Edge blocks (i.e., those with a strong feature in only one-dimension) are not good feature blocks because correspondence in the other dimension cannot be readily determined. Furthermore, high-frequency DCT coefficients can be affected by image noise. In a preferred embodiment, low-frequency DOT coefficients—specifically, DCT(0, 2), DCT(0, 3), DCT(2, 0), and DCT(3, 0)—are used to select feature blocks.

At step 404, a feature block metric score, FV, is computed and used to determine the relative strength of two-dimensional features in each pair of 8×8 pixel blocks (i.e., in each MCU). In other words, the feature block metric score, FV, serves as a quantitative measure of the suitability of an MCU as a feature block. According to a disclosed embodiment, the feature block metric score, FV, is computed as follows:

$$FV = \max(\min(S_{v1}, S_{h1}), \min(S_{v2}, S_{h2})) \qquad (3)$$

wherein $S_{v1}$ and $S_{h1}$ are the vertical and horizontal edge strength scores, defined below, of a first 8×8 pixel block of an MCU and $S_{v2}$ and $S_{h2}$ are the vertical and horizontal edge strength scores of a second 8×8 pixel block of the MCU.

The vertical and horizontal edge strength scores referenced in Equation (3) are computed, according to a disclosed embodiment as follows:

$$S_v = |DCT(0,2)| + |DCT(0,3)| \qquad (4)$$

$$S_h = |DCT(2,0)| + |DCT(3,0)| \qquad (5)$$

At step 405, it is determined whether there are more MCUs in the current region g of the current strip of the reference frame. If there are more MCUs, the block counter b is incremented at step 410 and the method continues at step 403. Otherwise, the method continues at step 406.

At step 406, it is determined whether the MCU with the highest feature block metric score, FV, meets minimum criteria. The determination at step 406 is intended to avoid selecting low-quality feature blocks, which might occur, for example, when no MCU in a region contains a strong two-dimensional feature. In a disclosed embodiment, the feature block metric score, FV, is compared against a threshold. If FV exceeds the threshold, then the selected block is confirmed as a feature block at step 407 and the method continues to step 408. Otherwise, no feature block is selected for region g and the method continues at step 408.

Selecting a feature block near the edge of the reference frame can also be undesirable because the object in the block exhibiting a strong two-dimensional feature is more likely to move outside the imaging area between frames (e.g., in the time elapsed between capturing the reference frame and a target frame or vice-versa). Therefore, MCUs near the left and right sides of the reference frame can also be excluded as potential feature blocks. These excluded portions 505, 506 are illustrated in FIG. 5. The MCUs can be excluded at step 406 (i.e. by skipping step 407 if the MCU with the highest feature block metric score FV is an edge block). In an alternative embodiment, edge MCUs are excluded prior to step 403. In other words, edge MCUs are excluded as feature block candidates prior to computation of respective feature block metric scores.

At step 408, it is determined whether there are more regions in the reference strip. If there are more regions, the region counter g is incremented at step 409 and the method continues at step 402. Otherwise, selection of feature blocks in the current strip of the reference frame ends. If there are more strips in the reference frame, the method 104 can be repeated for each strip to select feature blocks throughout the reference frame.

Referring again to the high-level flow chart of FIG. 1, once feature blocks in the reference frame have been selected at step 104, motion estimation can be performed at step 105. At step 105, target frames are searched to identify features corresponding to the reference frame feature blocks selected at step 104. Motion vectors corresponding to the movement of the feature blocks between the reference frame and each target frame are stored and used to solve affine transformation matrices at step 106. For example, if three target frames are captured at step 103, then each feature block selected at step 104 may have up to three associated motion vectors.

Figure 6:
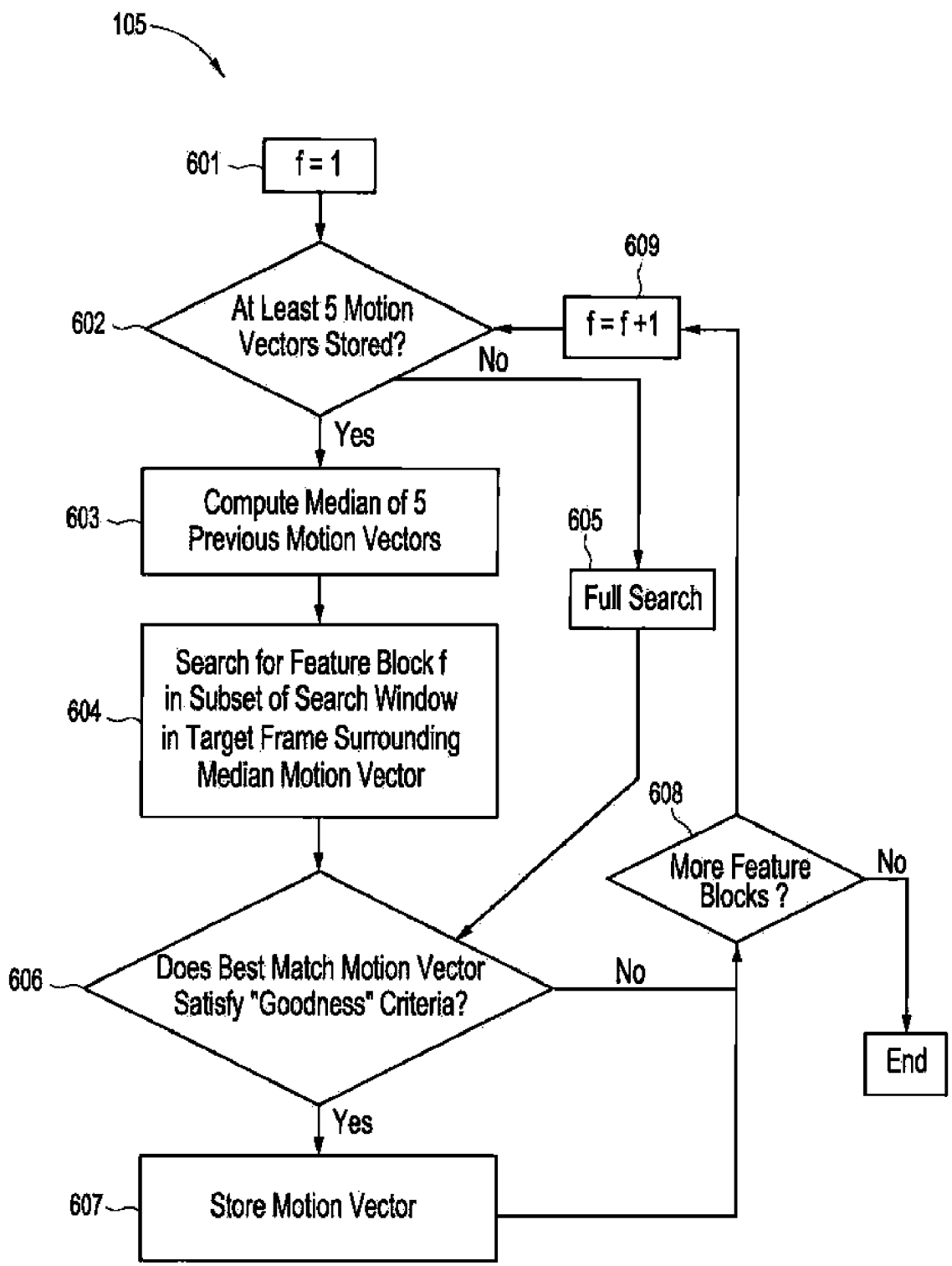
FIG. 6 is a flow chart illustrating a method for estimating motion to obtain motion vectors in accordance with a disclosed embodiment.
Figure 7A:
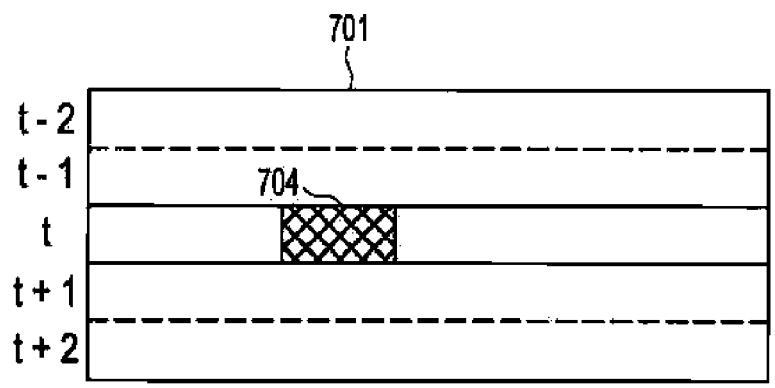
FIG. 7A illustrates a feature block in a portion of a reference frame in accordance with a disclosed embodiment.

A method of estimating feature block motion (i.e., step 105) in accordance with a disclosed embodiment is illustrated in the flow chart of FIG. 6. As with the feature block selection method illustrated in FIG. 4, the motion estimation method illustrated in FIG. 6 operates on one strip (e.g., one row of MCUs) of the reference frame. FIG. 7A illustrates a feature block 704 within strip t of reference frame 701. Motion estimation for features throughout the reference frame can be performed by repeating the method illustrated in FIG. 6 for each strip of the reference frame.

Figure 7B:
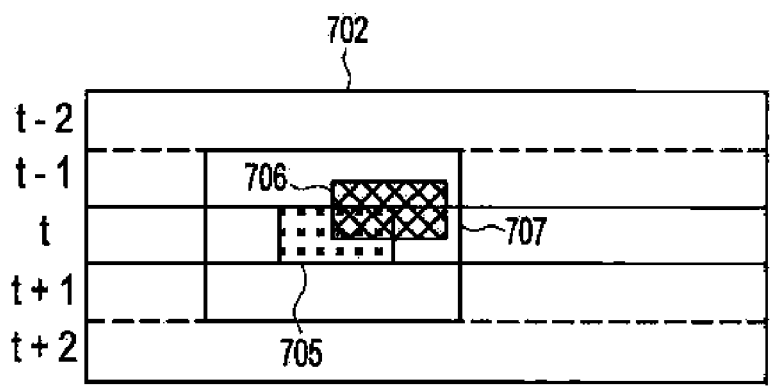
FIG. 7B illustrates a full search window in a portion of a target frame in accordance with a disclosed embodiment.

Referring to FIG. 6, at step 601 a feature block counter f is initialized to 1 representing the first feature block in the current strip of the reference frame. At step 602, it is determined whether at least a threshold number of motion vectors (e.g., five motion vectors) have been previously stored. If fewer than the threshold number of motion vectors have been stored, a full search (i.e., a search of all candidate motion vectors in a search window) is performed at step 605. FIG. 7B illustrates a full search window 707 in a target frame 702. MCU 705 of target frame 702 corresponds to the location of feature block 704 of reference frame 701 (i.e., the feature block 704 would be coincident with MCU 705 if the feature block 704 did not move between the reference frame 701 and the target frame 702).

The full search window 707 can be defined as a region of pixels centered around the corresponding MCU 705. In the illustrated embodiment, the full search window 707 extends one MCU in each direction (typically, 8 pixels vertically and 16 pixels horizontally). However, other embodiments are possible. For example, the full search window 707 could be circular or elliptical rather than rectangular, or the full search window 707 could be larger or smaller (e.g., extending 64 or more pixels in each direction from the corresponding MCU 705). The size of the search window can be determined based on, among other tings, the amount of motion anticipated under particular imaging conditions. For example, one would expect features in a sequence of images captured by a hand-held camera to exhibit more motion than features in a sequence of images captured by a studio camera mounted on a sturdy tripod.

Candidate motion vectors within the full search window 707 are assigned a score to quantify the extent to which each candidate motion vector corresponds to the actual movement of a feature. In a disclosed embodiment, the score is sum of the absolute difference (SAD) of luminance channel (Y) pixel values in the feature block 704 and the candidate block 706 (i.e., the block of pixels corresponding to the position of the feature block 704 offset by the amount of the candidate motion vector). The candidate motion vector with the lowest SAD is deemed the best match (i.e., the best representation of the motion of the feature in the feature block between the reference frame and the target frame.)

A full search algorithm, which exhaustively searches all candidate motion vectors within the search window 707, will yield a motion vector with a global minimum SAD. However, the computational complexity of the full search algorithm can be prohibitive in real-time implementations. Therefore, a faster algorithm may be preferable, even if it does not guarantee identification of the motion vector with the global minimum SAD. Several suitable fast search algorithms (e.g., diamond search and hexagon search) are known in the art. In general, these algorithms reduce computational complexity by searching only a subset of candidate motion vectors. For example, a fast search might be limited to candidate motion vectors in the vicinity of a starting search point. A poor starting search point can lead to motion vectors with a local minimum SAD substantially greater than the global minimum SAD. Therefore, selection of a good swing search point is preferable.

Because strips in a target frame are captured at substantially the same time, one can assume that good motion vectors (i.e., those with a SAD close to the global minimum SAD) will not change substantially from one strip to the next. Therefore, a median of past motion vectors (e.g., the preceding five motion vectors) can be used as the starting search point. A sufficient number of past motion vectors may not be available when processing the first few strips of a frame. Therefore, a hybrid search scheme can be used. For the few strips of a frame (i.e., until enough motion vectors are available), a full search can be used. Depending on the direction of motion, however, objects near the top of the reference frame (i.e., in the first few strips) might have moved outside the target frame being searched. Therefore, in an alternative embodiment, the full search car begin at a strip further down in the frame (e.g., at the fifth strip in the frame). Once enough motion vectors are determined by the full search algorithm, a hexagon or other fast search algorithm can be used to reduce computational complexity. If a fast search algorithm is to be used when searching for a feature block f (i.e., if it is determined at step 602 that at least the threshold number of motion vectors have been stored previously), the median of several previous motion vectors (e.g., five motion vectors) is computed at step 603.

Figure 7C:
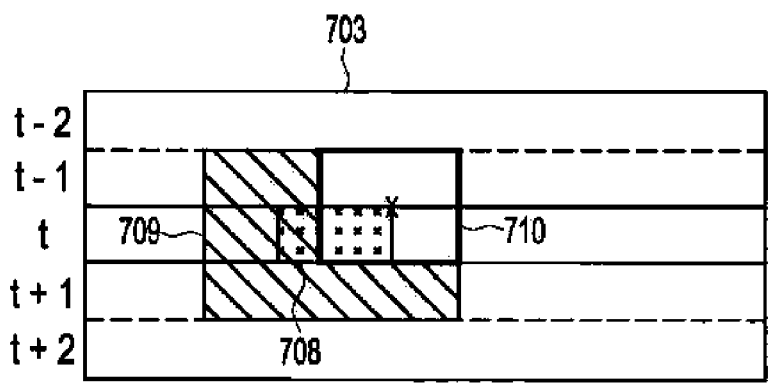
FIG. 7C illustrates a fast research window in a portion of a target frame in accordance with a disclosed embodiment.

FIG. 7C illustrates one possible fast search window 710 that can be used at step 604. As described above with respect to MCU 705 of FIG. 7B, MCU 708 corresponds to the location of feature block 704 of reference frame 701, meaning the feature block 704 would be coincident with MCU 708 if the feature block 704 did not move between the reference frame 701 and the target frame 703. The median motion vector computed at step 603 is denoted by an X in FIG. 7C. The fast search window 710 can be centered around the median motion vector. By limiting the search to the fast search window 710 rather than the full search window 709, computational complexity can be reduced and efficiency increased.

In FIG. 7C, the fast search window 710 is illustrated as about one-quarter the size of full search window 709, however other embodiments are possible. For example, the fast search window might have a rounded shape and be of any size smaller than the full search window 709. In yet other embodiments, the median motion vector X could be used as the starting point for any known fast search algorithm, such as, for example, diamond search or hexagon search, as described above.

Not all motion vectors, even those with minimum SAD within a search window, are good motion vectors. In other words, some motion vectors may not accurately describe the movement of a feature block between the reference frame and a target frame. At step 606, a "goodness" measure is used to evaluate the quality of each motion vector. In a disclosed embodiment, the goodness value for a motion vector is computed by comparing the SAD of the best match candidate motion vector with the SAD of the second best match candidate motion vector. According to a disclosed embodiment, a motion vector is sufficiently "good" if the following condition is satisfied:

$$SAD_1 - SAD_0 > \frac{SAD_0}{8} \quad (6)$$

where $SAD_0$ is the SAD value of the best match candidate motion vector $(x_0, y_0)$ and $SAD_1$ is the SAD value of the second best match candidate motion vector $(x_1, y_1)$ such that the following condition is true:

$$|x_0-x_1|+|y_0-y_1|<1 \quad (7)$$

If the difference between $SAD_0$ and $SAD_1$ is large, then the best match candidate motion vector is uniquely good and more likely to accurately represent the movement of a feature between the reference frame and a target frame. At step 607, good motion vectors are stored in a memory (e.g., a motion vector table). Bad motion vectors (i.e., those that do not satisfy the "goodness" condition given in Equation (6) above) are discarded.

Once the best match motion vector for feature block f has been either stored or discarded, the method continues at step 608. At step 609, it is determined whether there are more feature blocks to be searched in the current strip of the reference frame. If there are more feature blocks to be searched, the method continues at step 609, where the feature block counter is incremented. The method then to step 602 and the search process is repeated for the next feature block. If here are no more feature blocks to be searched, searching with respect to the current reference frame strip is complete. If more reference frame strips remain to be searched, the method illustrated in FIG. 6 can be repeated for the reaming strips.

Referring again to the high-level flow chart of FIG. 1, at step 106 image distortion due to imager (e.g., handheld camera) motion between the reference frame and each target frame is modeled as an affine transformation, which can include, for example, translation, rotation, and scaling. To reduce computational complexity, one affine transformation matrix can be solved for each strip of the reference frame rather than for each feature block. For examples if a reference frame contained 128 strips (i.e., 128 rows of MCUs) and there were three target frames, 384 affine transformation matrices would be solved at step 106.

Figure 8:
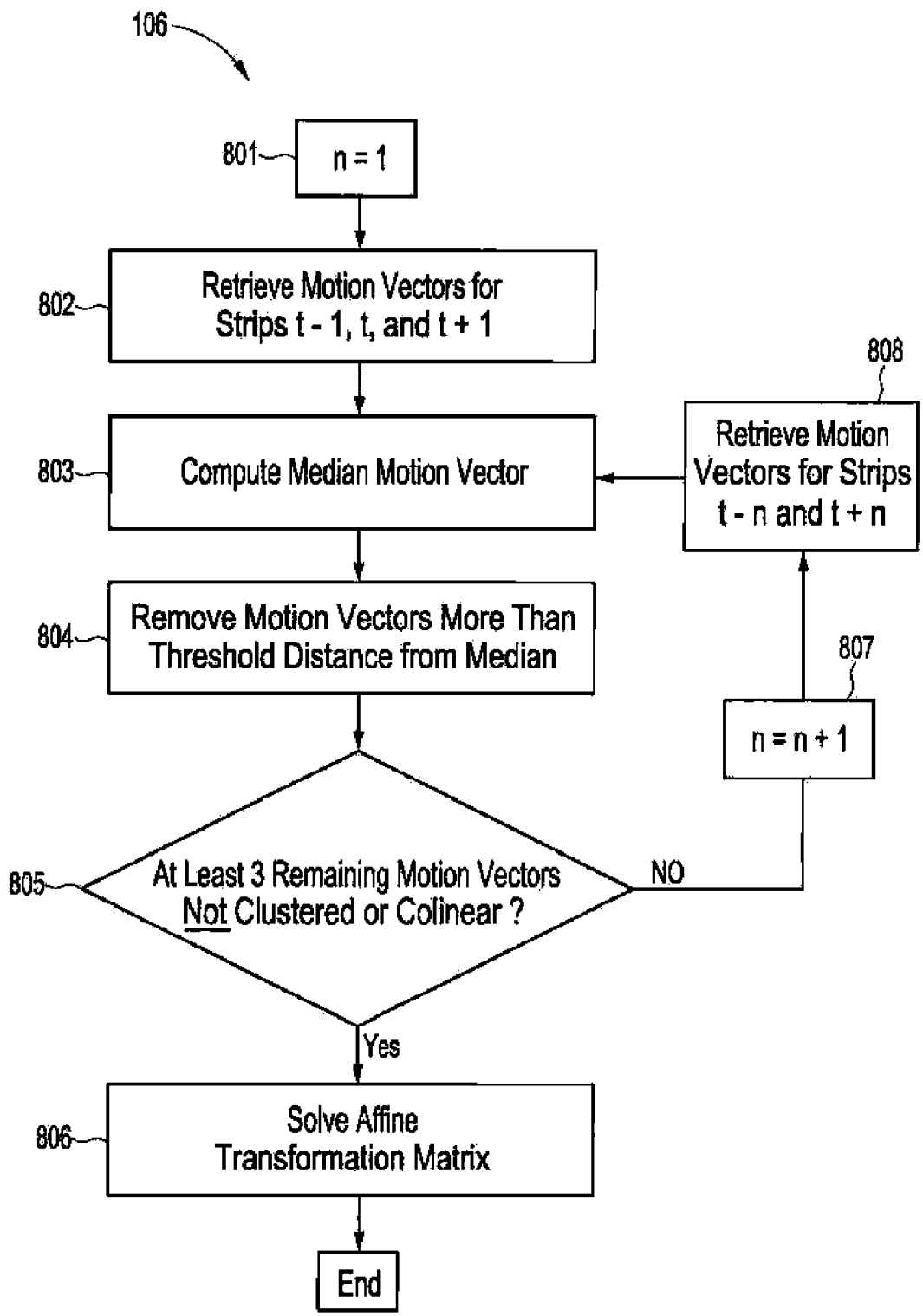
FIG. 8 is a flow chart illustrating a method for solving an affine transformation matrix in accordance with a disclosed embodiment.

FIG. 8 illustrates a method, according to a disclosed embodiment, for solving an affine transformation matrix (i.e., step 106) to describe the motion of feature blocks in a strip t of the reference frame relative to one target frame. At step 801, a distance counter n is initialized to 1, referring to the strips immediately above and below strip t (i.e., those strips one strip distant from strip t). At step 802, motion vectors for feature blocks in strips t−1, t, and t+1 of the reference frame, which were determined and stored at step 105, are retrieved from memory.

In addition to the "goodness" threshold described above, motion vector quality can be further improved by removing outlier motion vectors. At step 803, a median motion vector of the motion vectors retrieved at step 802 is computed. At step 804, motion vectors more than a threshold distance from the median motion vector are excluded. As described in detail below with respect to step 806, at least three motion vectors that are not clustered or co-linear are preferable to reliably solve an affine transformation matrix. At step 805, it is determined whether at least three such motion vectors remain after outlier motion vectors are excluded at step 804. If at least three such motion vectors remain, the method continues at step 806. If fewer than three such motion vectors remain, the method continues at step 807. At step 807, the range counter n is incremented and, at step 808, motion vectors associated with strips t−n and t+n are loaded from memory. Outlier motion vectors are again removed at steps 803 and 804, and, at step 805, it is again determined whether at last three suitable motion vectors remain. Motion vectors associated with increasingly distant strips of the reference frame are included until at least three suitable motion vectors remain after outlier motion vectors are excluded. The method then proceeds to step 806.

At step 806, an affine transformation is constructed based on the at least three motion vectors remaining after step 805. The affine transformation can be expressed as a matrix as follows:

$$\begin{bmatrix} x' \\ y' \\ 1 \end{bmatrix} = \begin{bmatrix} c_1 & c_2 & c_3 \\ c_4 & c_5 & c_6 \\ 0 & 0 & 1 \end{bmatrix} \times \begin{bmatrix} x \\ y \\ 1 \end{bmatrix} \quad (8)$$

where (x, y) is the position of a pixel in the reference frame, (x', y') is the position of the corresponding pixel in a target frame, and $c_1$ to $c_n$ are affine transformation matrix coefficients. To solve the affine transformation matrix coefficients $c_1$ to $c_n$, at least three non-collinear control points are required. The at least three control points can be derived from the at least motion vectors remaining after step 805. For example, let a motion vector (mv.x, mv.y) represent the movement of a feature block between the reference frame and a target frame and let the pixel at coordinate (x, y) in the reference frame be the center of the feature block. This maps to a corresponding block with a center pixel at coordinate (x', y')=(x+mv.x, y+mv.y) in the target frame.

Although the affine transformation matrix coefficients can be solved with only three non-collinear control points, a greater number of control points is desirable. With only three control points, an inaccuracy in the motion vectors used to derive the control points will cause the affine transformation matrix coefficients to be incorrect and, therefore, cause erroneous registration between the reference frame and target frame. Using more control points can reduce the effect of an error in any one of the underlying motion vectors, thereby improving image registration accuracy.

A method for solving the affine transformation matrix coefficients $c_1$ to $c_n$ will now be described. In the following example, assume there are n control points $(x_i, y_i)$ in the reference frame mapping to $(x'_i, y'_i)$ in a target frame, where $n \geq 3$ and $i=1, 2, \ldots n$. The relationship between the control points and the affine transformation matrix coefficients can be expressed as follows:

$$\begin{cases} x_i c_1 + y_i c_2 + c_3 = x'_i \\ x_i c_4 + y_i c_5 + c_6 = y'_i \end{cases} \text{ for } i = 1, 2, \ldots, n \quad (9)$$

Equation (9) can be rewritten in matrix form as follows:

$$\begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ \vdots & \vdots & \vdots & \vdots & \vdots & \vdots \\ x_n & y_n & 1 & 0 & 0 & 0 \\ 0 & 0 & 0 & x_n & y_n & 1 \end{bmatrix} \times \begin{bmatrix} c_1 \\ c_2 \\ c_3 \\ c_4 \\ c_5 \\ c_6 \end{bmatrix} = \begin{bmatrix} x'_1 \\ y'_1 \\ x'_2 \\ y'_2 \\ \vdots \\ x'_n \\ y'_n \end{bmatrix} \quad (10)$$

In general, Equation (10) is of the form AC=B where A is a 2n-by-6 matrix, C is a 6-by-1 vector, and B is a 2n-by-1 vector. For example, if the minimum number of control points were used (i.e., if n=3), A would be a 6×6 square matrix and B would be a 6×1 vector.

Equations of the form AC=B, such as Equation (10) above, can be solved to determine the values of the affine transformation matrix coefficients $c_1$ to $c_n$. However, if n>3, then equation is an over-determined linear system and has no exact solution. In this case, an approximate solution that minimizes the least square error can be determined by rewriting matrixes A and C and vector B as follows:

$$\|AC-B\|^2 = (AC-B)^T(AC-B) \quad (11)$$

where T represents the matrix transpose operation.

The minimum can be found at the zero of the first derivative of Equation (11) with respect to C as follows:

$$2A^T AC - 2A^T B = 0 \quad (12)$$

Therefore, the least square error solution of Equation (10) satisfies the following condition:

$$A^T AC = A^T B \quad (13)$$

where $A^T A$ is a 6×6 square matrix. Thus, Equation (13) is a normal equation and can be solved to determine the affine transformation coefficients $c_1$ to $c_n$ of vector C.

As indicated above, computational complexity can be reduced by solving only one affine transformation matrix per strip rather than, for example, solving an affine transformation matrix for every feature block. Since strips are long but narrow, typically 8 pixels (i.e., one MCU) tall and several hundred or more pixels wide, the at least three non-collinear control points used to solve the affine transformation matrix are preferably not proximate in the horizontal dimension. When the at least three non-collinear control points are too close to each other, particularly in the horizontal dimension, a small inaccuracy in the vertical position of any control point can result in a large error in the affine transformation matrix.

Referring again to the high-level flow chart of FIG. 1, at step 107, the affine transformation matrices are used to identify and combine corresponding pixels in the reference and target frames. As a further check on the quality of motion vectors and the resulting affine transformation matrices, only corresponding pixels whose color channel values are within a threshold—referred to herein as the "pixel composition threshold"—distance are combined in the output image. In other words, if a pixel in the reference frame and a pixel in the target frame truly represent the same object in a scene, then the reference frame pixel and corresponding target frame pixel should have similar luminance and chrominance values. To reduce computational complexity, pixels can be processed in 2×2 pixel blocks. Because, as noted above, the JPEG compression algorithm typically stores pixel data in YCbCr 4:2:2 format, each 2×2 pixel block contains four luminance (Y) values, $Y_0, Y_1, Y_2$, and $Y_3$, two first chrominance (Cb) values, $Cb_0$ and $Cb_1$, and two second chrominance (Cr) values, $Cr_0$ and $Cr_1$.

As a first step in determining whether the pixel composition threshold is satisfied, the mean difference of the Y, Cb, and Cr channel values of a 2×2 pixel block in the reference frame and the corresponding 2×2 pixel block in a target frame—denoted $\Delta Y$, $\Delta Cb$, and $\Delta Cr$, respectively—can be computed as follows:

$$\Delta Y = \frac{(Y_{0i} + Y_{1i} + Y_{2i} + Y_{3i}) - (Y_{0r} + Y_{1r} + Y_{2r} + Y_{3r})}{4} \quad (14)$$

$$\Delta Cb = \frac{(Cb_{0i} + Cb_{1i}) - (Cb_{0r} + Cb_{1r})}{2} \quad (15)$$

$$\Delta Cr = \frac{(Cr_{0i} + Cr_{1i}) - (Cr_{0r} + Cr_{1r})}{2} \quad (16)$$

where subscript t denotes pixel values in the target frame and subscript r denotes pixel values in the reference frame.

Using the $\Delta Y$, $\Delta Cb$, and $\Delta Cr$ values, the mean difference of the red (R), green (G), and blue (B) channels—denoted $\Delta R$, $\Delta G$, and $\Delta B$, respectively—can be computed as follows:

$$\Delta R = |\Delta Y + ((\Delta Cr \times 45) >> 5)| \quad (17)$$

$$\Delta G = |\Delta Y - ((\Delta Cb \times 11) >> 5) - ((\Delta Cr \times 23) >> 5)| \quad (18)$$

$$\Delta B = |\Delta Y + ((\Delta Cb \times 57) >> 5)| \quad (19)$$

where >> represents a bitwise right shift operation.

The mean differences, $\Delta R$, $\Delta G$, and $\Delta B$, are compared to the pixel composition threshold. If the differences are smaller than threshold, then the pixel values of the 2×2 pixel block of the target frame are added to the corresponding pixel values of the reference frame. If any of the differences exceed the threshold, then the corresponding reference frame pixel values are left unchanged. This process is repeated for all 2×2 pixel blocks in all target frames.

The combined pixel values of the reference frame are divided by the number of target frames whose pixel values were added thereto plus one to determine average pixel values. For example, if, for a given 2×2 pixel block, one of three target frames satisfied the pixel composition threshold describe above, then the combined pixel values of the reference frame would be divided by two to compute the average of the reference frame and target frame pixel values. If, on the other hand, the 2×2 pixel blocks of all three target frames satisfied the pixel composition threshold criteria, then the combined pixel values in that 2×2 pixel block of the reference frame would be divided by four. These average pixel values are used to generate the output image.

When the number of frames contributing pixel values to a combined pixel value is a power of two (e.g., 2 or 4), the division step described above can be quickly performed by bit shifting. For example, to divide 11010100 (212 in decimal notation) by two, the bits can be shined to the right one position to yield 01101010 (106 in decimal notion). If three frames contribute, however, division by three would be required. To avoid this complexity, the reference frame values can be added a second time, thereby increasing the effective number of contributing frames to four and again allowing division by bit shifting.

As described above, a pixel composition threshold can be used to increase the likelihood that only truly corresponding pixels (i.e., pixels depicting the same object in a scene) are combined. The pixel composition threshold can be determined based on factors such as, for example, frame noise levels and/or how well the reference and target frames are registered. In a disclosed embodiment, a global pixel composition threshold, $T_g$, is computed based on a noise level, which can be derived from integration time, gain, and known noise characteristics of the particular imager used to cape the frames. The global pixel composition threshold, $T_g$, can then be refined based on several additional factors, as described below.

The global pixel composition threshold, $T_g$, can be refined based on the total number of motion vectors and number of outlier motion vectors in a strip of the reference frame to derive a strip pixel composition threshold, $T_s$. In general, a larger total number of vectors yields a higher threshold and a larger number of outlier vectors yields a lower threshold. According to a disclosed embodiment, if the number of motion vectors is less than tree or the number of outlier motion vectors is greater than 1, then $$T_s = \frac{T_g}{2}.$$

Otherwise, $T_s = T_g$.

The strip pixel composition threshold, $T_s$, can be further refined to derive a block pixel composition threshold, $T_b$, by comparing a luminance value of a portion of the reference frame with a luminance value of a corresponding portion of a target frame. In general, similar luminance values yield a higher threshold. To compute the block pixel composition threshold, $T_b$, according to a disclosed embodiment, let $\Delta \overline{Y}$ equal the absolute value of the difference between the mean luminance channel (Y) value of the reference block and the mean luminance channel (Y) value of the corresponding target block. If $\Delta \overline{Y}$ is greater than a threshold, $T_m$, then $$T_b = \frac{T_s \times T_m}{\Delta \overline{Y}}.$$

otherwise, $T_b = T_s$.

The block pixel composition threshold, $T_b$, can be yet further refined based on the mean luminance value in the reference block, $\overline{Y}$. Noise levels are typically higher in darker areas of an image, so the pixel composition threshold is preferably higher for darker blocks to more effectively reduce noise. The block pixel composition threshold, $T_b$, can thus be scaled according to the following table:

| $\overline{Y}$ | Factor |
|---|---|
| <32 | 2.000 |
| <64 | 1.500 |
| <96 | 1.250 |
| <128 | 1.125 |

According to a disclosed embodiment, the block pixel composition threshold, $T_b$, is multiplied by the greatest factor satisfying the given $\overline{Y}$ condition. For example, if the average luminance value of the reference frame block were 80 (i.e., $\overline{Y}=80$), then $T_b$ would be scaled by a factor of 1.25 (i.e., $T_b$ is multiplied by 1,250).

An example method for composing output strips (i.e., strips of the output image) in a memory-efficient way will now be described. Before composing an output strip corresponding to a current strip t, motion vectors for reference frame strips from 0 to t+2 are preferably determined and loaded into memory. Motion vectors for all strips except strip t+2 are assumed to be in memory already since they would have been required when processing strip t−1. Thus, strip t+2 of the reference frame remains to be decoded and stored in memory. Assuming each strip is eight pixels (one MCU) tall, then strip t+2 begins at frame line (T+2)×8.

As described above, a median of past motion vectors can be used as a starting point for a fast search to determine subsequent motion vectors. For each target frame, compute the median motion vector, denoted (MedMV.x, MedMV.y), of the last five motion vectors up to strip t+1. Assuming a preferable search range of +/−16 pixels, target frame pixel data up to row (t+2)×8+MedMV.y+24 is loaded in memory (e.g., a strip buffer) for motion estimation. If these rows of target frame pixel data are already in memory, then motion estimation can proceed immediately. Otherwise, target frame strips can be decoded and loaded into memory so these rows are available for use during motion estimation.

Reference frame and target frame strip buffers are preferably used to store the rows of pixel data for motion estimation. The reference frame strip buffer can preferably store at least three strips (i.e., 24 rows assuming a typical 8-row MCU) of pixel data. Each target frame strip buffer can preferably store at least seven strips (i.e., 56 rows assuming a typical 8-row MCU) of pixel data. These strip buffer sizes may be sufficient for typical imaging scenarios where imager motion is limited and mostly confined to the pitch and yaw axes. If, however, imager motion is substantial, particularly about the roll axis, larger strip buffers may be required. If additional memory required for larger strip buffers is not available at the outset, memory can be dynamically allocated and the size of strip buffers increased during processing.

Since a full search algorithm is used until enough motion vectors are available to determine a reliable starting point for a fast search algorithm, as describe above, each target frame strip buffer is preferably able to store pixel data for the full search window. Assuming a vertical search range of +/−R pixels, the target frame strip buffers can preferably store at least (2R+8) rows of pixel data. The maximum search range, R, can be limited as necessary given available memory capacity. For example, if the search range is constrained to 64 pixels (i.e., R=64), then each target frame strip buffer would preferably be able to store 136 rows of pixel data.

An output strip buffer able to store eight rows of pixel data (i.e., the height of a typical MCU) can be used to store output pixel data (i.e., pixel values derived from a combination of reference frame pixel values and the corresponding target frame pixel values) before the combined pixel data is JPEG encoded or otherwise used to form an output image.

Figure 9:
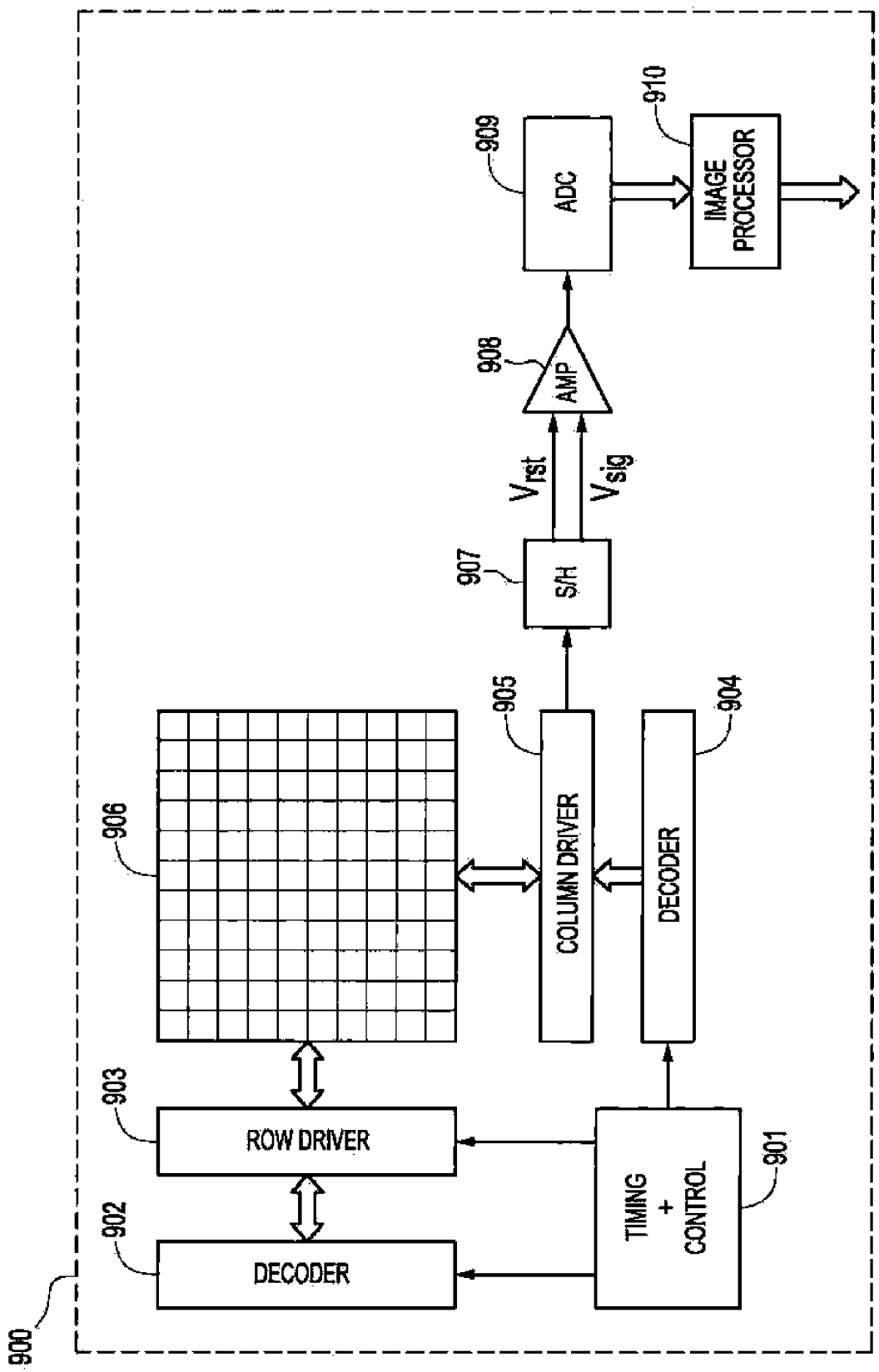
FIG. 9 is a partial top-down block diagram of an imager and associated readout circuitry constructed in accordance with a disclosed embodiment.

The following paragraphs describe how to implement embodiments of the disclosure in an imager and a processor system. FIG. 9 is a partial top-down block diagram view an imager 900 and associated read-out circuitry constructed in accordance with an embodiment disclosed herein. Although FIG. 9 illustrates a CMOS imager and associated read-out circuitry, embodiments may include other types of imagers, for example a CCD imager.

When the imager 900 is operated to capture light, the pixel cells in each row of pixel array 906 are all turned on at the same time by a row select line, and the signals of the pixel cells of each column are selectively output onto output lines by respective column select lines. A plurality of row and column select lines are provided for the array. The row lines are selectively activated in sequence by a row driver 903 in response to a row address decoder 902 and the column select lines are selectively activated in sequence for each row activation by a column driver 905 in response to a column address decoder 904. Thus, row and column addresses are provided for each pixel cell of the pixel array 906. The imager 900 is operated by the timing and control circuit 901, which controls the address decoders 902, 904 for selecting the appropriate row and column select lines for pixel cell read-out, and the row and column drivers 903, 905, which apply driving voltage to the drive transistors of the selected row and column lines.

In a CMOS imager, the pixel cell output signals typically include a pixel reset signal $V_{rst}$ taken off of a floating diffusion region (via a source follower transistor) when it is reset and a pixel image signal $V_{sig}$, which is taken off the floating diffusion region (via the source follower transistor) after charges generated by an image are transferred to it. The $V_{rst}$ and $V_{sig}$ signals for each pixel of pixel array 906 are read by a sample and hold circuit 907 and are subtracted by a differential amplifier 908 that produces a difference signal ($V_{rst}-V_{sig}$) for each pixel cell of pixel array 906, which represents the amount of light impinging on the pixel cell. This signal difference is digitized by an analog-to-digital converter (ADC) 909. The digitized pixel signals are ten fed to an image processor 910 which processes the pixel signals and forms a digital image output. It is also possible to have separate driver and read-out circuits for each sub-array with the pixel output signal from the ADC 909 of each sub-array feeding into a common image processor circuit 910. As depicted in FIG. 9, the imager 900 is formed on a single semiconductor chip, although other configurations are possible, as known in the art.

Image processor circuit 910 may be constructed as a hardware circuit with associated memory, or as a programmed processor with associated memory, or as a combination of a hardware circuit and a programmed processor with associated memory. In one embodiment, the image processor circuit 910 is a pixel signal pipeline processing circuit configured to implement motion blur reduction in accordance with embodiments disclosed herein. Motion blur reduction can be implemented late in the pixel processing pipeline, for example, after demosaicing, because motion blur reduction algorithms often operate on multi-channel data for each pixel (e.g., ROB or YUV values for each pixel) rather than raw pixel data received from the pixel array. Other configurations are possible, however. For example, motion blur reduction might be not be performed in the pixel processing pipeline at all but rather by a central processing unit (CPU) 1004 connected to the imager 900 by a bus 1003, as shown in FIG. 10, or by a stand alone computer that receives an image from imager 900 via a communications medium, e.g. a portable data storage device such as, for example, a flash memory card or a compact disc, or a transmission medium such as, for example, the Internet, a serial or parallel cable, or a local area network.

Figure 10:
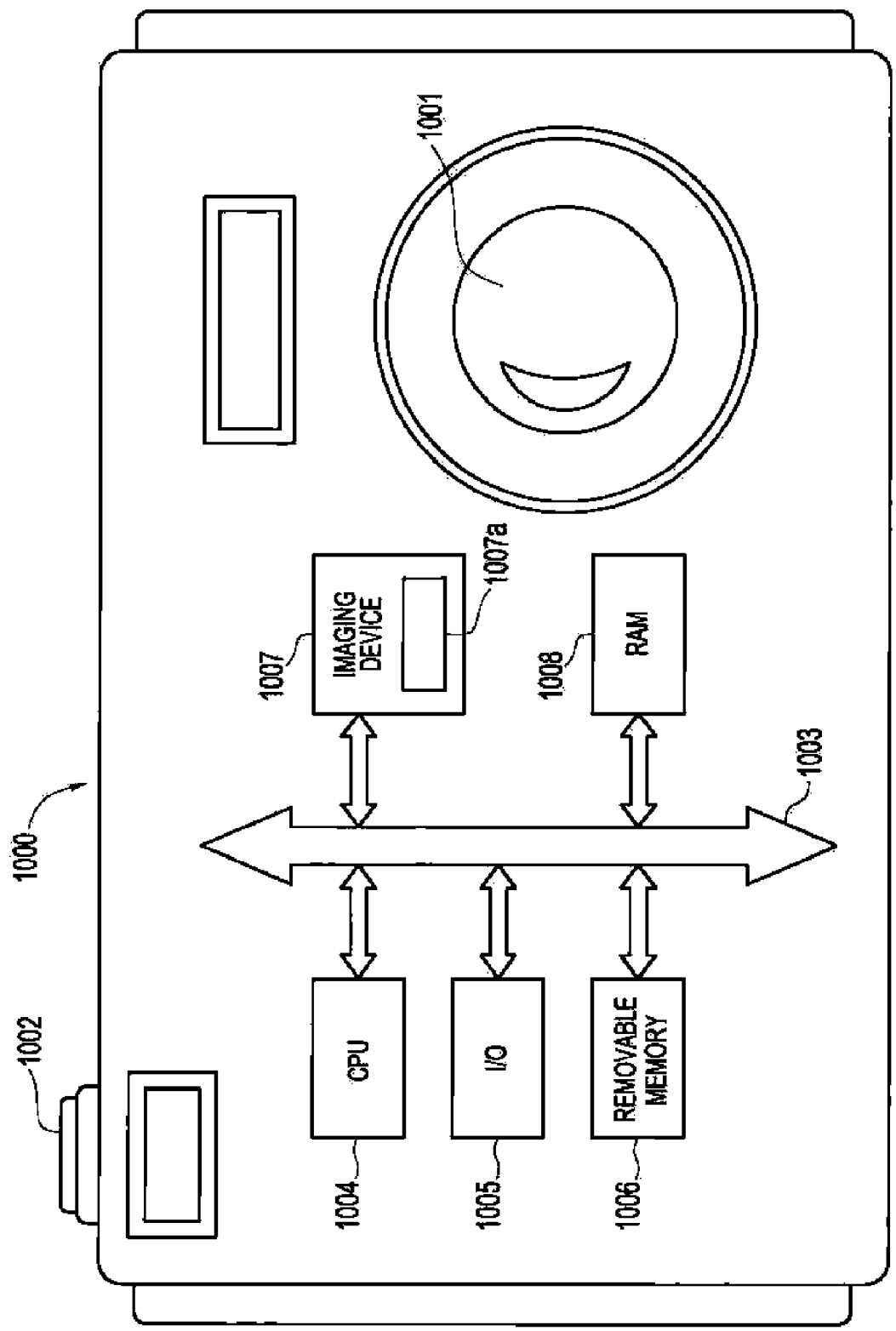
FIG. 10 is a block diagram of a processor system constructed in accordance with a disclosed embodiment.

FIG. 10 shows a typical processor system 1000, such as, for example, a digital camera. The system 1000 includes a CPU 1004 configured to implement motion blur reduction in accordance with embodiments disclosed herein. Without being limiting, such a system could also be a personal computer or workstation, camera, scanner, machine vision, vehicle navigation system, video phone, surveillance system, auto focus system, star tracker system, motion detection system, image stabilization system, or any other system able to implement false color artifact reduction in accordance with disclosed embodiments.

In one embodiment in which the system 1000 is a digital camera, the system 1000 includes a lens 1001 for focusing an image on a pixel array 1007a of an imaging device 1007 when a shutter release button 1002 is pressed. System 1000 also comprises the CPU 1004, such as a microprocessor that controls camera functions and image flow, and communicates with an input/output (I/O) device 1005 over a bus 1003. The CPU 1004 might also perform motion blur reduction, although this could be accomplished by another processor or even a dedicated image processing chip (not shown). The imager 1007 of device 1000 also communicates with the CPU 1004 over the bus 1003. The system 1000 also includes random access memory (RAM) 1008, and can include removable memory 1006, such as flash memory, which also communicates with the CPU 1004 over the bus 1003. The imaging device 1007 may be combined with the CPU 1004, with or without memory storage on a single integrated circuit or on a different chip than the CPU.

In another embodiment the system 1000 is a personal computer comprising a CPU 1004, which communicates with an I/O device 1005 and RAM 1008 over a bus 1003. In this embodiment, the system 1000 does not necessarily include an imaging device 1007. Rather, digital pixel values are transferred from another device, for example a digital camera, via any communications medium, for example by the I/O device 1005. The digital pixel values may be in the form of a RAW image file generated by a digital came or any other suitable image format, such as, for example, Tagged Image File Format (TIFF). The I/O device might be, for example, a USB port a memory card reader, a network port, a parallel port, a serial port, a FireWire port, a floppy disk drive, an optical disk drive, or a wireless transceiver. Once loaded in a memory, for example RAM 1008 or possibly non-volatile storage such as a hard drive (not shown), the CPU 1004 can perform motion blur reduction in accordance with the embodiments disclosed herein. The resulting image might then be saved in a memory, for example removable memory 1006 or RAM 1008, output via an output device (not shown), for example a photo printer, posted on the Internet or manipulated further by software, such as, for example, Adobe Photoshop®. Indeed, software such as Adobe Photoshop® may be configured to implement the disclosed embodiments by, for example, a plug-in program module or by programming a filter or macro.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. Accord-

What is claimed as new and desired to be protected by Letters Patent of the United States is:

1. A method of reducing motion blur, the method comprising:
   capturing a sequence of frames, the sequence comprising a reference frame and a plurality of target frames;
   identifying a plurality of feature blocks in the reference frame;
   conducting motion searches to locate a best match of each feature block in each target frame;
   correlating features in each target frame with features in the reference frame;
   computing a motion vector corresponding to a movement of each feature from the reference frame to the target frame;
   combining corresponding pixels in the reference frame and each of the plurality of target frames to form an output image; and
   capturing a calibration frame and determining a frame compression quality level based at least in part on the calibration frame such that the reference frame and sequence of target frames can be simultaneously stored in a memory, wherein the reference frame and plurality of target frames are compressed at the frame compression quality level and stored in the memory.

2. The method of claim 1, wherein the reference frame is captured approximately in the middle of the plurality of target frames.

3. The method of claim 1, wherein the reference frame is the sharpest frame.

4. The method of claim 1, wherein the feature blocks are selected such that each feature block includes a two-dimensional feature.

5. The method of claim 1, wherein the combining step comprises:
   identifying one pixel of each target frame corresponding to each pixel of the reference frame based at least in part on the motion vectors; and
   averaging values of corresponding pixels to form the output image comprising average pixel values.

6. The method of claim 5, wherein the identifying step comprises solving an affine transformation matrix using at least three control points derived from the motion vectors.

7. A method of reducing effects of imager movement during integration, the method comprising:
   capturing a reference frame and a plurality of target frames, the reference frame comprising a plurality of strips, each strip comprising a plurality of regions;
   performing a discrete cosine transformation of blocks of pixels in the reference frame;
   selecting the block in each region of each strip determined to have the strongest two-dimensional features based at least in part on results of respective discrete cosine transformations;
   searching each target frame to find a best match of each selected block;
   identifying a pixel in each target frame corresponding to each pixel of the reference frame based on a respective affine transformation matrix derived at least in part from motion vectors representing the movement of features between the reference frame and the target frame;
   combining corresponding pixels from the reference frame and the plurality of target frames to form an output image;
   capturing a calibration frame;
   compressing portions of the calibration frame at different respective compression quality levels;
   interpolating an optimal compression quality level such that image quality is maximized and the reference frame and plurality of target frames can be simultaneously stored in a memory; and
   compressing the reference frame and plurality of target frames at the optimal compression quality level and storing them in the memory.

8. The method of claim 7, wherein the blocks correspond to JPEG minimum coded units.

9. The method of claim 7, wherein each block comprises 128 pixels arranged in a 16×8 pixel pattern.

10. The method of claim 9, wherein the strength of two-dimensional features in each 16×8 pixel block are quantified by a feature block metric FV computed as follows:

$$FV = \max(\min(S,,,S,,,), \min(S1,2, {}^Sh2))$$

wherein $S,,,_1$ and $S_{h1}$ represent the vertical and horizontal edge strength of a first 8×8 pixel sub-block of the 16×8 pixel block, respectively, and $S,,,_2$ and $S_h e$ represent the vertical and horizontal edge strength of a second 8×8 pixel sub-block of the 16×8 pixel block, respectively, wherein the vertical edge strength, $s,,,$, and the horizontal edge strength, $S_h$, are computed as follows:

$$S, = DCT(0,2) + DCT(0,3)$$

$$S\,DCT(2,0) + DCT(3,0)I$$

wherein DCT(i, j) denotes a discrete cosign transform coefficient, and wherein i and j are integers ranging from 0 to 7, inclusive, with DCT(0, 0) being proportional to the mean value of the sub-block and each higher integer corresponding to a one-half cycle frequency increase.

11. The method of claim 7, wherein the searching step comprises searching all candidate motion vectors in a search window surrounding a first selected block and selecting the candidate motion vector yielding the lowest sum of absolute difference of pixel values.

12. The method of claim 11, wherein the searching step further comprises performing a hexagon search in a search window surrounding a second selected block, the starting point of the searching being based at least in part on motion vectors selected when searching other blocks.

13. The method of claim 7, further comprising identifying and excluding outlier motion vectors before deriving an affine transformation matrix.

14. The method of claim 13, wherein the identifying and excluding outlier motion vectors step comprises:
   calculating a median motion vector;
   comparing each motion vector to the median motion vector; and
   excluding motion vectors whose distance from the median motion vector exceeds a threshold.

15. The method of claim 7, wherein the combining step comprises averaging a pixel value from the reference frame and corresponding pixel values from target frames, wherein a corresponding pixel value from a target frame is included in the average only if the mean difference between color channel values of the reference frame pixel value and a target frame pixel value is less than a threshold.

16. The method of claim 15, wherein the threshold is determined based at least in part on at least one of a noise level of the target frame and a registration confidence level.

17. The method of claim 7, wherein the compressing step comprises:

dividing the calibration frame into a plurality strips; and compressing each strip using the JPEG compression algorithm and a respective set of quantization tables, wherein each set of quantization tables is the default quantization tables defined in the JPEG specification multiplied by a respective scaling factor.

18. The method of claim 17, wherein the interpolating step comprises:

summing the number of bytes required to store strips at a compression quality level;

multiplying the sum by the number of compression quality levels to determine the approximate number of bytes required to store the entire calibration frame at the compression quality level;

fitting a polynomial to data points, each data point comprising a compression quality level and a corresponding number of bytes required to store the entire calibration frame at the compression quality level; and selecting the optimal compression quality level based on the polynomial and the storage capacity of the memory.

* * * * *